Patented Feb. 20, 1945

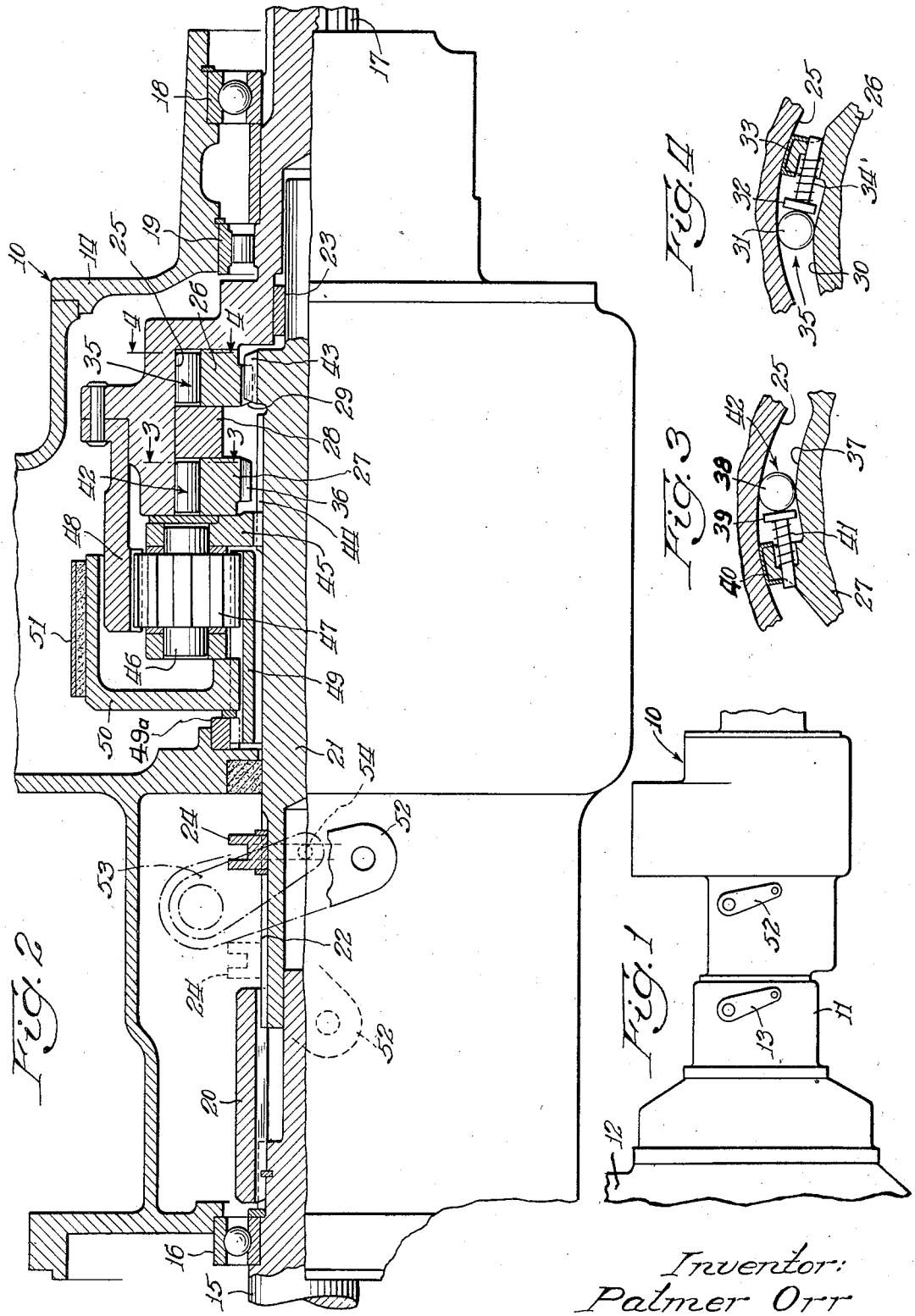

2,369,976

UNITED STATES PATENT OFFICE 2,369,976

POWER TRANSMISSION MECHANISM

Palmer Orr, Muncie, Ind., assignor to Borg-Warner Corporation, Chicago, Ill., a corporation of Illinois Application November 23, 1942, Serial No. 466,537

6 Claims. (Cl. 74—290)

My invention relates to a power transmission mechanism and more particularly to a transmission gear.

Motor driven vehicles in general, as well as many other power driven devices, are provided with reversing mechanism in their power trains for driving either in one direction or in the other direction. It is an object of my invention to provide an improved transmission having a driving or input shaft and a driven or output shaft which is suitable for use in such a power train in tandem with a reversing mechanism with the driving shaft of the transmission being driven by the reversing mechanism. A vehicle having such a power train and with which it is contemplated my transmission shall be particularly useful is disclosed in the copending application of Benjamin A. Swennes, Serial No. 461,623, filed October 10, 1942. It is also an object to provide such a transmission so constructed that it provides a free-wheeling drive for a drive in both directions by the reversing mechanism. It is contemplated that when the reversing mechanism is set to drive in one direction, my improved transmission may be set to drive in the same direction, and when the reversing mechanism is set to drive in the opposite direction, my improved transmission may also be set to drive in such direction.

More particularly it is an object of my invention to provide an improved transmission comprising a one-way clutch adapted for driving the driven shaft of the transmission in one direction and a one-way clutch adapted for driving the driven shaft in the opposite direction, with the construction being such that the one-way clutches may selectively be connected between the driving and the driven shafts of the transmission.

It is also an object of my invention to provide an improved transmission, particularly suitable for use connected in tandem with a reversing mechanism, with its driving shaft being driven by the reversing mechanism, and which is of such construction to provide a plurality of speed ratios for both directions of rotation of its driving shaft. To this end, it is an object to provide an improved transmission comprising a pair of one-way clutches selectively connectible between the driving and driven shafts of the transmission and adapted for driving the driven shaft in opposite directions, with the transmission also comprising gearing for driving the driven shaft of the transmission in either direction at a speed greater than that at which it is driven by means of either of the one-way clutches. It is contemplated that such gearing preferably shall be of the epicyclic type comprising sun, ring and planet gears, a planet carrier and a brake for the sun gear, with the planet carrier being connected to be driven by the driving shaft of the transmission and with the ring gear being connected with the driven shaft of the transmission.

The invention consists of the novel constructions, arrangements and devices to be hereinafter described and claimed for carrying out the above stated objects and such other objects as will appear from the following description of a certain preferred embodiment illustrated in the accompanying drawing wherein:

Fig. 1 is a side view of my improved transmission, a reversing unit and a motor connected in tandem;

Fig. 2 is a longitudinal sectional view on an enlarged scale of my improved transmission; and Figs. 3 and 4 are sectional views taken on lines 3—3 and 4—4 respectively of Fig. 2.

Like characters of reference designate like parts in the several views.

Referring now in particular to Fig. 1 of the drawing, my improved transmission, which is designated by the reference character 10, is connected in tandem with a reversing mechanism 11 of any suitable construction. The reversing mechanism in turn is connected in tandem with a motor 12 which may be of any suitable type and construction and may be used for powering any type of driven apparatus, such as an automotive vehicle, for example. The reversing mechanism 11 is provided with an operating lever 13 by means of which its output shaft (not shown) may be controlled to rotate in one direction or the other when the motor 12 is in operation.

Referring now particularly to Figs. 2, 3 and 4 of the drawing, a more detailed description of my improved transmission 10 will be given. The transmission comprises a housing 14 in which is journalled a driving shaft 15 by means of a bearing 16 and a driven shaft 17 by means of bearings 18 and 19. The driving shaft 15 is driven by the output shaft (not shown) of the reversing unit 11 in the tandem arrangement of the transmission and reversing unit shown in Fig. 1, and the shaft 15 as shown in the drawing preferably simply constitutes one end of the output shaft of the reversing unit. An internally splined sleeve-like member 20 is fastened to the driving shaft 15, and a shaft 21, which may also be termed a driving shaft and which fits over shaft 15 and is slidable longitudinally with respect thereto, is provided with a splined portion 22 which fits in the splined member 20. At its other end the shaft 21 is piloted in the shaft 17 by means of a bearing 23, and it is thus supported. The shaft 21 is provided with a grooved collar 24 which is fixed on the shaft against longitudinal movement relative thereto for purposes hereinafter to be described.

The shaft 17 has formed on an end thereof an internal cylindrical surface 25. A ring-like member 26, a second ring-like member 27 and a spacing member 28 between the members 26 and 27 are provided in the cylindrical portion 25 of the shaft. The member 26 is provided with teeth 29 on its inner surface and is provided with cammed surfaces 30 (one being shown in the drawing) on its outer surface (see Fig. 4). A roller 31 is disposed between each of the cammed surfaces 30 and the cylindrical surface 25, and a plunger 32 is provided for each of the rollers for forcing it up the respective cammed surface 30. Each plunger 32 is slidably mounted in a portion 33 of the ring member 26 which is in the form of a lug, and a spring 34 is provided for pressing the plunger against the adjacent roller. The surfaces 30 and 25 and the rollers 31 together form a one-way clutch 35 by means of which the shaft 17 may be rotated in a clockwise direction as seen in Fig. 4 when the ring member 26 is rotated in such direction. The one-way clutch 35 also functions to permit the shaft 17 to rotate at a faster speed or "free wheel" in a clockwise direction with respect to the ring member 26.

The ring member 27 is provided on its inner surface with teeth 36 which are similar to teeth 29, and it is provided on its outer surface with cammed surfaces 37 (one being shown in the drawing). The surfaces 37 are similar to the cammed surfaces 30 with the exception that the surfaces 37 are disposed oppositely from the surfaces 30 as is apparent from a comparison of Figs. 3 and 4. Rollers 38, plungers 39, plunger supports 40 and springs 41 are provided in the same relation to each other as the corresponding parts of the one-way clutch 35 with the exception that the parts are reversed as is apparent. The surfaces 25 and 37 and the rollers 38 form a one-way clutch 42, which functions similarly to the one-way clutch 35 except that the shaft 17 is rotated in a counterclockwise direction instead of a clockwise direction, as seen in Figs. 3 and 4, when the ring member 27 is rotated in such direction.

The shaft 21 is provided with a plurality of teeth 43 which are adapted to intermesh with either the teeth 29 of the member 26 or the teeth 36 of the member 27 depending on the longitudinal position of the shaft 21. The shaft 21 may be thereby connected either with the one-way clutch 35 or the one-way clutch 42.

The shaft 21 is provided adjacent its teeth 43 with a splined portion 44 on which is slidably and non-rotatably mounted a planet gear carrier 45. The carrier 45 is provided with a plurality of stub shafts 46 (one being shown in the drawing) on each of which is rotatably mounted a planet gear 47. A ring gear 48 is provided in mesh with the planet gears 47, and the ring gear is connected by any suitable means with the shaft 17. A sun gear 49 is provided coaxial with the shaft 21 and in mesh with the planet gears 47, and the gear 49 is rotatably mounted with respect to the housing 14 by a washer-like bearing 49a which is internally splined to fit on the gear.

A brake drum 50 is fixed by any suitable means to the sun gear 49, and a brake 51 actuated by any suitable means (not shown) is provided on the drum 50. The ring gear 48, the sun gear 49, the planet gears 47, and the planet carrier 45 form epicyclic gearing, and such gearing functions, as is well known, with the sun gear held stationary and the carrier being driven, to drive the ring gear at a speed greater than that of the carrier.

The driving shaft 21 may be moved longitudinally in either direction in order to control the transmission 10 by means of a lever 52 which is swingably mounted with respect to the housing 14. A fork 53 embracing the collar 24 and having portions 54 in the groove of the collar is connected to move with the lever 52, and the fork 53 on movement of the lever 52 functions to move the collar 24 and thereby the shaft 21 longitudinally by means of the portions 54 of the fork. When the lever 52 is in its full line position as seen in Fig. 2, the teeth 43 of the shaft 21 are in mesh with the teeth 29 of the ring member 26, and when the lever 52 is moved to its dotted line position as seen in the figure, the shaft 21 is moved to bring its teeth 43 in mesh with the teeth 36 of the ring member 27.

The transmission 10 operates to provide a direct drive between driving shafts 15 and 21 and driven shaft 17 for either direction of rotation of the shafts, and the transmission further provides an overdrive ratio for either direction of rotation of the shafts whereby the driven shaft 17 rotates at a greater speed than the driving shafts 15 and 21. When the shaft 21 is in its position as shown in Fig. 2 with the teeth 43 in mesh with the teeth 29 and if the driving shafts 15 and 21 and thereby the ring member 26 are rotated in a clockwise direction as seen in Figures 3 and 4, the driven shaft 17 will be driven by means of the one-way clutch 35 in free-wheeling direct drive at the same speed and in the same direction as the driving shafts and ring member. When the shaft 21 is moved longitudinally from its position as shown in Fig. 2 such that the teeth 43 mesh with the teeth 36 and if the shafts 15 and 21 and ring member 27 are rotated in the opposite direction, counter-clockwise as seen in Figs. 3 and 4, the driven shaft 17 will be rotated in free-wheeling direct drive in this direction by means of the one-way clutch 42.

When the driven shaft 17 is rotated in one direction or the other by means of either the one-way clutch 35 or the one-way clutch 42, and it is desired to increase the speed of rotation of the shaft 17, the brake band 51 is brought into engagement with the brake drum 50. The brake band 51 operates to hold the drum 50 and thereby the sun gear 49 stationary, and since the planet carrier 45 is connected to rotate with the shaft 21, the ring gear 48 and thereby the driven shaft 17 are rotated at a speed greater than that of the shafts 15 and 21 and in the same direction as these shafts. One of the one-way clutches, 35 or 42, depending with which ring member, 26 or 27, the shaft 21 is connected by its teeth 43, overruns when the shaft 17 is driven at the greater speed.

The operating lever 13 of the reversing mechanism 11 may be controlled to provide a complete power train between the motor 12 and the driven shaft 17 for both directions of rotation of the shaft 17 at both transmission ratios. When the shaft 21 is in its position as shown in Fig. 2 with its teeth 43 in engagement with teeth 29 of ring member 26, the operating lever 13 of the reversing mechanism 11 may be controlled such that the reversing mechanism rotates the shaft 15 and thereby the ring member 26 in a clockwise direction as seen in Figs. 3 and 4, and the power train will then be complete between the motor 12 and the shaft 17 for rotating the shaft in the same direction as the shaft 15. When the shaft 21 is moved longitudinally such that its teeth 43 are inter-engaged with the teeth 36 of the ring member 27, the operating lever 13 of the reversing mechanism 11 may be controlled such that the reversing mechanism drives the shaft 15 and thereby the ring member 27 in a counter-clockwise direction, as seen in Figs. 3 and 4, and the power train will then be complete from the motor 12 to the shaft 17 to rotate the shaft 17 in the same direction as the shaft 15. When the operating lever 13 of the reversing mechanism is so controlled to provide a complete power train through either of the one-way clutches, 35 or 42, between the motor 12 and shaft 17, the brake band 51 may be brought into engagement, and the power train will thereafter be complete between the motor 12 and shaft 17 through the epicyclic gearing.

My improved transmission is advantageously constructed to provide both direct drive and overdrive speed ratios for both forward and reverse drive, with the transmission being placed in a power train in tandem with and driven by a reversing mechanism. The transmission is furthermore of simple construction and it may be economically manufactured.

It will be apparent to those skilled in the art that changes may be made in the constructions and arrangements shown and described without departing from the principles of my invention. In particular it will be apparent that although I have described my improved transmission more particularly in connection with a motor driven vehicle, my improved transmission is suitable for use in any power train by means of which power is transmitted in both directions, forward and reverse. I wish it to be understood, therefore, that my invention is not to be limited to the specific constructions and arrangements shown and described, except so far as the claims may be so limited.

I claim:

1. In a transmission, the combination of a driving shaft, a driven shaft, a one-way clutch for providing a drive in one direction from said driving shaft to said driven shaft, a second one-way clutch for providing a drive in the opposite direction from said driving shaft to said driven shaft, and gearing adapted to be selectively rendered operative for driving said driven shaft from said driving shaft in either direction and at speeds greater than the speeds at which the driven shaft is rotated by means of said one-way clutches.

2. In a transmission, the combination of a driving shaft, a driven shaft, a one-way clutch for providing a drive in one direction from said driving shaft to said driven shaft, a second one-way clutch for providing a drive in the opposite direction from said driving shaft to said driven shaft, means selectively connecting either of said one-way clutches to provide a drive between shafts, and epicyclic gearing adapted to be selectively rendered operative for driving said driven shaft from said driving shaft and at speeds greater than the speeds at which the driven shaft is driven by means of said one-way clutches.

3. In a transmission, the combination of a driving shaft, a driven shaft, a one-way clutch adapted when driven to drive said driven shaft in one direction, a second one-way clutch adapted when driven to drive said driven shaft in the opposite direction, means for selectively connecting said driving shaft with either of said one-way clutches, and epicyclic gearing adapted to be selectively rendered operative for driving said driven shaft from said driving shaft in either direction and at a greater speed than said driving shaft.

4. In a transmission, the combination of a driving shaft, a driven shaft, a one-way clutch for providing a drive in one direction from said driving shaft to said driven shaft, a second one-way clutch for providing a drive in the opposite direction from said driving shaft to said driven shaft, means for selectively connecting either of said one-way clutches to provide a drive between said shafts, epicyclic gearing comprising sun and ring gear members, a planet gear in mesh with said members, and a carrier for said planet gear, one of said members being connected with one of said shafts and said carrier being connected with the other of said shafts, and means for holding stationary the other of said members.

5. In a transmission, the combination of a driving shaft, a driven shaft, a one-way clutch for providing a drive in one direction from said driving shaft to said driven shaft, a second one-way clutch for providing a drive in the opposite direction from said driving shaft to said driven shaft, means for selectively connecting either of said clutches to provide a drive between said shafts, gearing comprising a sun gear, a ring gear, and a planet gear in mesh with the sun and ring gears, a carrier for said planet gear, said ring gear being connected with said driven shaft and said carrier being connected with said driving shaft, and a brake for said sun gear.

6. In a transmission, the combination of a driving shaft, a driven shaft, a one-way clutch adapted when driven to drive said driven shaft in one direction, a second one-way clutch adapted when driven to drive said driven shaft in the opposite direction, said driving shaft being movable longitudinally for selectively connecting the driving shaft in driving relation with either of said one-way clutches, epicyclic gearing comprising a sun gear, a ring gear and a planet gear in mesh with said sun and ring gears, a carrier for said planet gear, said ring gear being connected with said driven shaft and said carrier being connected with said driving shaft, and a brake for said sun gear.

PALMER ORR.